Sept. 15, 1970   J. L. FERGASON ET AL   3,529,156
HYSTERETIC CHOLESTERIC LIQUID CRYSTALLINE COMPOSITIONS
AND RECORDING DEVICES UTILIZING SUCH COMPOSITIONS
Filed June 13, 1966

WITNESSES
Wm. B. Sellers
James F. Young

INVENTORS
James L. Fergason and
Newton N. Goldberg
BY Alex Mich, Jr
ATTORNEY

United States Patent Office 3,529,156
Patented Sept. 15, 1970

3,529,156
HYSTERETIC CHOLESTERIC LIQUID CRYSTAL-
LINE COMPOSITIONS AND RECORDING DE-
VICES UTILIZING SUCH COMPOSITIONS
James L. Fergason, Penn Hills, Verona, and Newton N.
Goldberg, Penn Hills, Pittsburgh, Pa., assignors to
Westinghouse Electric Corporation, Pittsburgh, Pa., a
corporation of Pennsylvania
Filed June 13, 1966, Ser. No. 557,060
Int. Cl. G01n 21/00
U.S. Cl. 250—83                              12 Claims

ABSTRACT OF THE DISCLOSURE

This invention relates generally to cholesteric liquid crystalline compositions and to devices utilizing such compositions for recording or storing information.

---

Figure 1:
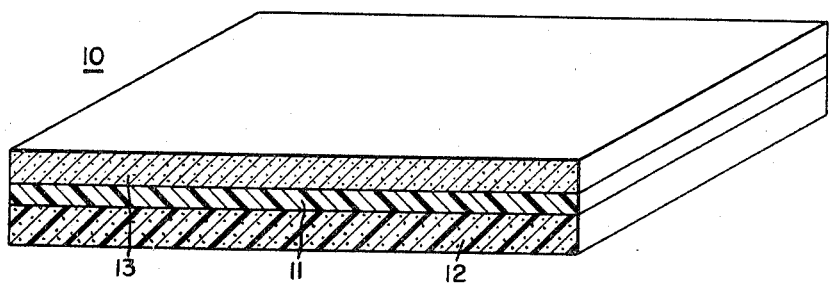

The molecular structure of cholesteric liquid crystalline substances is very delicately balanced and can be easily upset. Marked changes in the optical properties of the substances are produced by relatively minor changes or gradations in various environmental conditions. The most striking optical change is the variation of color with, for example, minor variations in temperature. When the substances are in the cholesteric phase, temperature gradients are observed as a vivid polychromatic pattern. Thin layers of liquid crystal substances may be spread on a black surface, for example, and covered with a transparent polyester film. A beam of light directed at the center of the layer will create a slight temperature gradient outwardly from the center. The temperature gradations will be illustrated by a brilliant pattern of different colors visible to the naked eye.

Imaging devices utilizing a cholesteric liquid crystalline phase material have been described in the prior art. U.S. Pat. No. 3,114,836, assigned to the assignee of this invention, describes such a thermal imaging device. Because the cholesteric liquid crystalline phase materials heretofore used for such devices have been reversible or non-hysteretic, that is, they change from one color to another, in response to changes from one temperature to another, very rapidly. The change of color has been so rapid that only an essentially instantaneous polychromatic thermal image is reliably presented. This rapid rate of color change is, of course, desirable in many applications. The rapid change, however, precludes the possibility of providing a primary record of the temperature or other environmental conditions being measured. If a record is desirable, a photograph of the polychromatic pattern must be made. Making such secondary records is both complex and time consuming. In some instances, where the environment to be measured or tested is either inaccessible or remote from light, the naked eye and/or the camera, it may be impossible to accurately record the environmental conditions.

Accordingly, it is an object of this invention to provide cholesteric liquid crystalline compositions that will provide a record of environmental conditions.

Another object of the invention is to provide novel hysteretic cholesteric liquid crystalline compositions which will change in color in response to environmental conditions only after a significant interval of time, thus providing a storage of information.

Yet another object of this invention is to provide a device which will provide a reasonably prolonged visual image that may be interpreted to provide information on environmental conditions such as temperature, electric fields and chemical vapors.

Another object is to provide a device for storing information on environmental conditions or changes in environmental conditions.

Another object of the invention is to provide a device for recording whether a particular temperature has been exceeded.

Briefly, the present invention accomplishes the foregoing objects by providing novel combinations or mixtures of compounds that possess a pronounced color change hysteresis after the transformation from the true liquid phase to the cholesteric phase. These hysteretic compositions may be employed as a thin film or layer over a dark background such as a pigmented plastic film to provide an information storing or recording device. The film of the hysteretic cholesteric liquid crystalline composition will have a given color in the cholesteric phase but will turn colorless at a given clearing point, i.e. the temperature at which it has changed to the liquid phase. Upon cooling to a temperature below the clearing point, which may be the ambient temperature, the change to the cholesteric phase occurs but the return of color will be delayed for a significant period of time. During that time then, it constitutes a record of the information. As will become apparent hereinbelow, the clearing point of a basic hysteretic composition may be either raised or lowered by the addition of appropriate agents. The hysteretic color effect is also present after exposure to high intensity electrical fields and predetermined concentrations of certain vapors.

Figure 2:
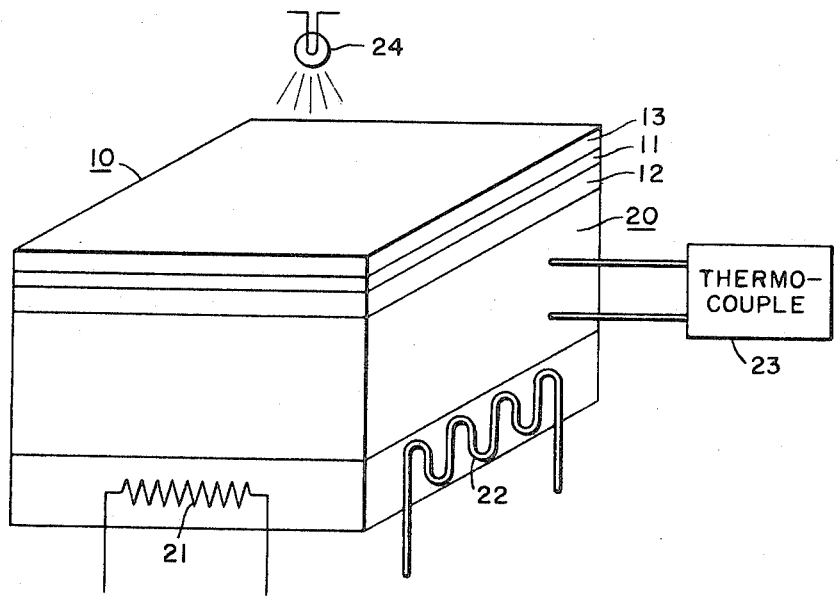

The foregoing and other objects and advantages of the present invention will become apparent when considered in view of the following detailed description and drawings, in which:

FIG. 1 is a cross-sectional view of a device in accordance with the invention having a pigmented layer on one side of a plastic film and a thin layer of a hysteretic liquid crystal on the other side of the clear film, and FIG. 2 is a cross-sectional view of a body in contact with a recording device of this invention having a film of a hysteretic liquid crystalline composition irradiated with visible light and observable by a human eye.

It has now been discovered, and the present invention is in large part based on this discovery, that certain liquid crystal cholesteric compositions may be formulated to provide a significant color change time lag after the change from the liquid phase to the cholesteric phase. Such hysteretic compositions may be employed, for example, to determine not only whether a given temperature has been exceeded but also to provide a record, for a significant time period, of whether the temperature has been exceeded. The lag in color change will also occur if the compositions have been exposed to high intensity electric fields in the order of 20 volts per micron or to gas vapors, such as vapors of chloroform in concentrations in the order of 100 p.p.m. in air.

It is apparent, of course, that not all cholesterogenic materials are hysteretic in their color transformations. Indeed, most of the heretofore known materials rapidly change color in response to environmental changes. The mixtures or combination of compounds of this invention return to their colored state, from a colorless liquid phase, only after a time delay in the order of 3 to 30 minutes. Moreover, the mixtures will have bright visible colors in the aligned cholesteric phase and will not crystallize in the range of normal temperatures, i.e. 0° F. to 300° F. The particular substrate employed, whether glass, polyester or some other clear plastic film, will have some effect on the actual color change delay time for a particular composition but the time delay phenomenon will be observed on all substrates.

The hysteretic liquid crystalline cholesteric mixtures of this invention contain (A) from about 15 to 40 percent, by weight, of at least one halide selected from the group consisting of cholesteryl chloride, cholesteryl bromide, cholesteryl iodide, cholestanyl chloride, cholestanyl bromide and cholestanyl iodide and (B) at least about 30 percent, by weight, of at least one compound selected from the group consisting of cholesteryl erucyl carbonate, cholestanyl erucyl carbonate, cholesteryl oleyl carbonate, cholestanyl oleyl carbonate, cholesteryl erucate, cholestanyl erucate, cholesteryl oleate and cholestanyl oleate.

Referring now to FIG. 1, there is illustrated as one example of the invention, a simplified temperature recording or information storing device 10 that includes a thin clear sheet of polyethylene terephthalate 11 having a thickness of about 6 microns. A pigmented film 12 containing carbon black dispersed in a thin layer of polyvinyl alcohol and having a thickness of about 12 microns is deposited on one side of the terephthalate film 11. The film 12 is applied as an aqueous solution or suspension and dried on the film 11. A film of a hysteretic liquid crystalline cholesteric mixture 13 having a thickness of about 10 microns is deposited on the other side of the terephthalate base 11. The film 13 is deposited by applying a 10 percent solution of the hysteretic mixture in petroleum ether onto the film 11 and evaporating the solvent.

As an illustration of the practice of the invention, there is shown in FIG. 2, the recording device 10 placed so that film 12 is in intimate contact with an aluminum plate or block 20. The block 20 is adapted to be heated, as for example, by a resistance heater 21, and is adapted to be cooled either by lower ambient temperatures after the heating has ceased or by cooling means such as the coil 22 containing circulating cold water. A thermocouple 23 is embedded in the plate 20 so that an accurate measurement of the temperatures of the block can be made. A source of white light 24 is provided so that the color of the layer of hysteretic film in the device will be visible to the naked eye. The visible color is, of course, a known phenomenon associated with the light scattering properties of the cholesteric phase.

EXAMPLE I

A series of simple recording devices was prepared, in the manner described hereinabove in conjunction with FIG. 1, using for film 13 a variety of simple admixtures or combinations of compounds in accordance with the constituent mixtures and composition ranges set forth above for the preparation of suitable hysteretic compositions. These simple devices were then placed in contact with the aluminum plate 20 of FIG. 2 and heated until there was a transformation from the cholesteric phase to the liquid phase. The phase transformation was apparent as the layer was observed to change from a vivid color to a colorless layer.

When the layer was cooled, it reverted to the cholesteric phase but the color returned only after a significant delay in time. The compositions presented in Table I hereinbelow were found to be hysteretic and their room temperature colors, i.e. the color of the cholesteric phase, and their clearing points, i.e. the melt point or liquid transition point, were as indicated. In each case, at least a three minute time lag was observed in the color change, after the layer had been cooled to a temperature where the material was in the cholesteric phase. All of the percentages in the table below and those that appear thereafter are weight percentages unless otherwise specified.

TABLE I.—PROPERTIES OF HYSTERETIC MIXTURES

| Example No. | Composition | Color of cholesteric phase | Clearing point, °C. |
|---|---|---|---|
| 1 | 30% cholesteryl chloride, 70% cholesteryl erucate. | Red | 37.5 |
| 2 | 20% cholesteryl chloride, 80% cholesteryl erucate. | Green | 38.2 |
| 3 | 15% cholesteryl chloride, 85% cholesteryl erucate. | Blue | 40 |
| 4 | 24% cholesteryl chloride, 76% cholesteryl oleyl carbonate. | Green | 45 |
| 5 | 20% cholesteryl chloride, 80% cholesteryl oleyl carbonate. | Blue | 45.4 |
| 6 | 30% cholesteryl chloride, 70% cholesteryl oleyl carbonate. | Red | 46 |
| 7 | 26% cholesteryl bromide, 74% cholesteryl oleyl carbonate. | Green | 43.8 |
| 8 | 26% cholesteryl bromide, 74% cholesteryl oleate. | do | 41.1 |
| 9 | 26% cholesteryl chloride, 74% cholesteryl erucyl carbonate. | do | 38.6 |

It should be understood that the foregoing are examples and that other film thicknesses and mixtures may be employed. Glass or other clear plastic films may be employed in place of the polyethylene terephthalate film. Other pigments e.g. gold black, may be substituted for the carbon black. The pigment may be dispersed in methyl cellulose, polyvinylpyrrolidone or other plastic materials in place of the polyvinyl alcohol. The color of the pigment should be complementary to the color of the light beam directed onto the hysteretic cholesteric layer. When the incident light is white, the pigment should be black. When the light is red, the pigment should be green, etc. The cholesteric layer may be deposited from other volatile organic solvents such as chloroform, halogenated hydrocarbons and volatile hydrocarbon solvents. The cholesteric layer need only be a few microns in thickness but may be in the order of 50 microns and more. It should also be understood that cholestanyl compounds may be substituted for the foregoing cholesteryl compounds to provide similar results.

As is apparent from the data in Table I, only a small variation in the clearing point occurs with varying amounts of compounds in a given combination of compunds. It has als been discovered, however, that significant changes in clearing points may be made by the addition of certain clearing point modulating agents. Up to 35 percent, by weight, of (c) a clearing point elevating agent selected from the group of esters consisting of cholesteryl nonanoate, cholestanyl nonanoate, cholesteryl decanoate and cholestanyl decanoate may be included in the admixture of compounds (A) and (B) to raise the clearing point temperature of the deposited cholesteric layer. The hysteretic effect is present in the layers even though the ester has been added to raise the clearing point. However, the total amount of materials or compounds selected from (A) and (C) should not exceed 60 percent of the weight of the total mixture. As little as 1.0 percent of the esters in the group (C) will have noticeable and useful effect in elevating the clearing point temperature of a basic mixture of (A) and (B). In general, the addition of about 5 percent of any of the esters (C) will raise the clearing point about one degree centigrade.

EXAMPLE II

Referring again to the device shown in FIG. 1, admixtures containing the compounds (A), (B) and the described esters (C) were employed to form the recording device 10 by depositing the admixture as a 10 micron thick layer 13 from a ten percent solution in petroleum ether onto one side of a 6 micron thick polyethylene terephthalate film 11. The other side of the film 11 had the pigmented layer 12 described hereinbefore. Recording devices, with the compositions described in Table II hereinbelow providing the hysteretic liquid crystalline cholesteric layers, were tested in the apparatus of FIG. 2 in the manner heretofore described in conjunction with the examples of Table I. Again, at least a three minute time lag was observed in the color change after the layer was cooled below its clearing point. That the esters (C) have a pronounced and predictable effect in elevating the clearing point of a basic mixture of a hysteretic cholesteric composition of (A) and (B) is apparent from the data of Table II.

TABLE II.—ELEVATION OF CLEARING POINT

| Example No. | Composition | Color of cholesteric phase | Clearing point, °C. |
|---|---|---|---|
| 10 | 28% cholesteryl chloride, 26% cholesteryl nonanoate, 46% cholesteryl oleyl carbonate. | Red | 51 |
| 11 | 28% cholesteryl chloride, 10% cholesteryl nonanoate, 62% cholesteryl oleyl carbonate. | Red | 44 |
| 12 | 28% cholesteryl chloride, 26% cholesteryl decanoate, 46% cholesteryl oleyl carbonate. | Red | 51 |
| 13 | 28% cholesteryl chloride, 10% cholesteryl decanoate, 62% cholesteryl oleyl carbonate. | Red | 44 |

It should be understood that cholestanyl nonanoate and decanoate may be substituted for the cholesteryl nonanoate and decanoate in the foregoing examples with similar results. Some variation in the actual clearing point may occur for identical amunts of the ester (C) in any hysteretic composition and the clearing points may be readily calibrated for the particular ester being employed. It should also be understood that both the cholesteryl and cholestanyl esters of the group (C) may be employed with either the cholestanyl and/or cholesteryl compounds of the groups (A) and (B).

In order to depress the clearing point of a given mixture of (A) and (B), up to about 10 percent of another class of modulating agents (D), in this instance known as depressing agents, may be included in the mixture. Fatty compounds which dissolve the admixture (A) and (B) without crystallizing will function as clearing point depressing agents. Suitable fatty compounds for this purpose include the fatty acids, fatty esters and fatty alcohols, both saturated and unsaturated. Suitable fatty acids are, saturated and unsaturated hydrocarbon acids with preferably over 8 carbon atoms, for example, oleic, stearic, palmitic, lauric, erucic, myristic and behenic acids. Suitable fatty esters are derived by reacting monohydric and polyhydric hydrocarbon alcohols, such as methyl and ethyl alcohol, ethylene glyceryl and glyceryl with the fatty acids, for example, methyl oleate, ethyl oleate, cetyl oleate, diolein, triolein, tributrin, tripalmitin, tristearin and mixtures thereof, particularly mixtures of trigyceryl esters of fatty acids such as the naturally occurring olive, sperm, soybean, corn and tall oils. Suitable fatty alcohols are, for example, oleyl, stearyl, cetyl and lauryl alcohols. The liquid fatty compounds are preferred but the solid compounds may be employed if the ultimate admixture with the combination of (A) and (B) does not crystallize. Crystallization will, of course, destroy the liquid crystal cholesteric phase.

EXAMPLE III

Again referring to FIG. 1, admixtures containing the compounds (A), (B) and the fatty compounds (D) were employed to form the simple recording device 10 by depositing various admixtures as a 10 micron thick layer 13 from a ten percent solution in petroleum ether onto one side of a 6 micron thick polyethylene terephthalate film 11. The other side of the film 11 had the pigmented layer 12 described hereinabove. Recording devices, with the compositions described in Table III hereinbelow being deposited as the hysteretic liquid crystalline cholesteric layers, were tested in the apparatus of FIG. 2 in the manner heretofore described. Again, at least a three minute time lag was observed in the color change after the various layers were cooled to temperatures below their clearing points. That the fatty compounds (D) have a predictable effect in depressing the clearing point of a basic mixture of a hysteretic composition of (A) and (B) is apparent from Table III.

TABLE III.—DEPRESSION OF CLEARING POINT

| Example No. | Composition | Color of cholesteric phase | Clearing point, °C. |
|---|---|---|---|
| 14 | 26% cholesteryl chloride, 73% cholesteryl oleyl carbonate, 1% oleic acid. | Green | 36.4 |
| 15 | 26% cholesteryl chloride, 72% cholesteryl oleyl carbonate, 2% oleic acid. | do | 35.3 |
| 16 | 26% cholesteryl chloride, 71% cholesteryl oleyl carbonate, 3% oleic acid. | do | 33.4 |
| 17 | 26% cholesteryl cholride, 73% cholesteryl oleyl carbonate, 1% methyl oleate. | do | 36 |
| 18 | 26% cholesteryl chloride, 72% cholesteryl oleyl carbonate, 2% methyl oleate. | do | 35 |
| 19 | 26% cholesteryl chloride, 71% cholesteryl oleyl carbonate, 3% methyl oleate. | do | 33 |
| 20 | 26% cholesteryl chloride, 73% cholesteryl oleyl carbonate, 1% triolein. | do | 36.5 |
| 21 | 26% cholesteryl chloride, 72% cholesteryl oleyl carbonate, 2% triolein. | do | 35.5 |
| 22 | 26% cholesteryl chloride, 71% cholesteryl oleyl carbonate, 3% triolein. | do | 33.5 |
| 23 | 26% cholesteryl chloride, 73% cholesteryl oleyl carbonate, 1% oleyl alcohol. | do | 36 |
| 24 | 26% cholesteryl chloride, 72% cholesteryl oleyl carbonate, 2% oleyl alchool. | do | 35 |
| 25 | 26% cholesteryl chloride, 71% cholesteryl oleyl carbonate, 3% oleyl alcohol. | do | 33 |
| 26 | 26% cholesteryl chloride, 73% cholesteryl oleyl carbonate, 1% olive oil. | do | 36.5 |
| 27 | 26% cholesteryl chloride, 72% cholesteryl oleyl carbonate, 2% olive oil. | do | 35.5 |
| 28 | 26% cholesteryl chloride, 71% cholesteryl oleyl carbonate, 3% olive oil. | do | 33.5 |
| 29 | 26% cholesteryl chloride, 73% cholesteryl oleyl carbonate, 1% sperm oil. | do | 36 |
| 30 | 26% cholesteryl chloride, 72% cholesteryl oleyl carbonate, 2% sperm oil. | do | 35 |
| 31 | 26% cholesteryl chloride, 71% cholesteryl olyel carbonate, 3% sperm oil. | do | 33 |
| 32 | 26% cholesteryl chloride, 73% cholesteryl oleyl carbonate, 1% tributrin. | do | 35.5 |
| 33 | 26% cholesteryl chloride, 72% cholesteryl oleyl carbonate, 2% tributrin. | do | 34.5 |
| 34 | 26% cholesteryl chloride, 71% cholesteryl oleyl carbonate, 3% tributrin. | do | 32.5 |

It should be understood that the depressing agents may be employed with the cholestanyl compounds as well as the cholesteryl compounds. Other fatty compounds may be substituted for those employed in the examples of Table III with equivalent results although some variations in the actual clearing point may occur. Again, calibration for the particular modulating agent being employed is recommended. The clearing point, in general, will be depressed from about 1 to 2 degrees centigrade for each weight percent of fatty compound in the admixture. As little as 0.1 percent of the fatty compound will provide a perceptible change in the clearing point of a particular admixture.

As noted heretofore, the device of FIG. 1 so long as it has a layer of hysteretic cholesteric liquid crystalline material, will function as a temperature recording device for the environment contacting the device. The device may be calibrated by the selection of a proper hysteretic film composition, to determine and record whether a particular temperature has been exceeded.

All of the heretofore described hysteretic compositions may be employed as thin films in devices which will record or store information on environmental conditions other than temperature. Again referring to FIG. 1, a 10 micron layer of a composition containing 28 percent cholesteryl chloride and 72 percent cholesteryl oleyl carbonate is deposited as the layer or film 13, the substrate sheet 11 and the pigmented film or layer 12 being as heretofore described in Example I. Such a device 10 will have an easily visible pronounced color at room temperature when exposed to white light. If a 200 volt field is applied across the 10 micron hysteretic cholesteric layer 13, the color will disappear and the layer will become colorless. The layer 13 will remain clear for about 3 weeks if it is not heated through its clearing point.

The same device may, instead, be employed to record the presence of contaminating vapors, for example. When exposed to air containing from 70 to 100 p.p.m. of either chloroform or trichloroethylene, the color will disappear. The hysteretic layer will remain colorless for about ten minutes after it is removed from the contaminating atmosphere unless heated through its clearing point.

Since numerous changes may be made in the above described compositions and devices and different embodiments of the invention may be made without departing from the spirit thereof, it is intended that all matter contained in the foregoing description or shown in the accompanying drawing be interpreted as illustrative and not in a limiting sense.

We claim as our invention:

1. A composition of matter suitable for determining and recording information consisting essentially of, by weight, (A) from about 15 to 40 percent of at least one halide selected from the group consisting of cholesteryl chloride, cholesteryl bromide, cholesteryl iodide, cholestanyl chloride, cholestanyl bromide and cholestanyl iodide, (B) at least about 30 percent of at least one compound selected from the group consisting of cholesteryl erucyl carbonate, cholestanyl erucyl carbonate, cholesteryl oleyl carbonate, cholestanyl oleyl carbonate, cholesteryl erucate, cholestanyl erucate, cholesteryl oleate and cholestanyl oleate, (C) up to 35 percent of a clearing point temperature elevating agent selected from the group of esters consisting of cholesteryl nonanoate, cholestanyl nonanoate, cholesteryl decanoate and cholestanyl decanoate and (D) up to 10 percent of a clearing point temperature depressing agent selected from the group consisting of fatty acids, fatty esters and fatty alcohols.

2. The composition of claim 1 containing from about 1 to 35 percent of (C), the total amount of compounds selected from (A) and (C) not exceeding 60 percent of the composition.

3. The composition of claim 1 containing from about 0.1 to 10 percent of (D).

4. The composition of claim 3 in which the depressing agent is the triglyceryl ester of a fatty acid.

5. A device for recording and storing information comprising, in combination, a clear transparent substrate, a thin film of a hysteretic liquid crystalline composition deposited on one side of the substrate, means directing light radiations onto the thin film and a pigmented layer on the opposite side of the substrate, the color of the pigmented layer being complementary to the light radiations.

6. The device of claim 5 in which the light radiations are white light radiations and the pigmented layer is a black pigmented layer thereby making the recorded information visible to the naked eye.

7. The recording device of claim 5 in which the hysteretic liquid crystalline composition consists essentially of, by weight, (A) from about 15 to 40 percent of at least one halide selected from the group consisting of cholesteryl chloride, cholestryl bromide, cholesteryl iodide, cholestanyl chloride, cholestanyl bromide and cholestanyl iodide, (B) at least about 30 percent of at least one compound selected from the group consisting of cholesteryl erucyl carbonate, cholestanyl erucyl carbonate, cholesteryl oleyl carbonate, cholestanyl erucyl carbonate, cholesteryl erucate, cholestanyl erucate, cholesteryl oleate and cholestanyl oleate, (C) up to 35 percent of a clearing point temperature elevating agent selected from the group of esters consisting of cholesteryl nonanoate, cholestanyl nonanoate, cholesteryl decanoate and cholestanyl decanoate and (D) up to 10 percent of a clearing point temperature depressing agent selected from the group consisting of fatty acids, fatty esters and fatty alcohols.

8. The device of claim 7 in which the hysteretic liquid crystalline composition contains from about 1 to 35 percent of (C), the total amount of compounds selected from (A) and (C) not exceeding 60 percent of the composition.

9. The device of claim 7 in which the hysteretic liquid crystalline composition contains from about 0.1 to 10 percent of (D).

10. The device of claim 9 in which the depressing agent is the triglyceryl ester of a fatty acid.

11. A device for recording and storing temperature information comprising a layer of an hysteretic liquid crystalline composition.

12. The device of claim 11 wherein the stored information is observable by a human eye.

References Cited
UNITED STATES PATENTS 3,114,836   12/1963   Fergason et al. _____ 250—83
3,409,404   11/1968   Fergason _____ 23—253 X ARCHIE R. BORCHELT, Primary Examiner U.S. Cl. X.R.
252—408, 501